US011826792B2

(12) United States Patent
Lebed

(10) Patent No.: US 11,826,792 B2
(45) Date of Patent: Nov. 28, 2023

(54) APPARATUS FOR REMOVING EXCESS MATERIAL AND METHOD OF OPERATING THE SAME

(71) Applicant: Siemens Energy Global GmbH & Co. KG, Munich (DE)

(72) Inventor: Yaroslav Lebed, Berlin (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 395 days.

(21) Appl. No.: 17/048,583

(22) PCT Filed: May 6, 2019

(86) PCT No.: PCT/EP2019/061504
§ 371 (c)(1),
(2) Date: Oct. 17, 2020

(87) PCT Pub. No.: WO2019/228760
PCT Pub. Date: Dec. 5, 2019

(65) Prior Publication Data
US 2021/0170491 A1    Jun. 10, 2021

(30) Foreign Application Priority Data
May 29, 2018    (EP) .................................... 18174849

(51) Int. Cl.
*B08B 15/02*    (2006.01)
*B33Y 40/00*    (2020.01)
(Continued)

(52) U.S. Cl.
CPC ............ *B08B 15/02* (2013.01); *B22D 29/005* (2013.01); *B22F 10/28* (2021.01); *B33Y 40/00* (2014.12);
(Continued)

(58) Field of Classification Search
CPC .. B08B 15/02; B08B 7/02; B08B 9/00; B22D 29/005; B22F 10/28; B22F 10/73;
(Continued)

(56) References Cited

U.S. PATENT DOCUMENTS

2006/0108712 A1*   5/2006   Mattes ................... B33Y 10/00
                                                                425/375
2016/0279871 A1    9/2016   Heugel et al.
(Continued)

FOREIGN PATENT DOCUMENTS

DE    102013223407 A1    5/2015
DE    202016003042 U1    7/2016
(Continued)

OTHER PUBLICATIONS

PCT International Search Report and Written Opinion of International Searching Authority dated Jun. 24, 2019 corresponding to PCT International Application No. PCT/EP2019/061504 filed May 6, 2019.

*Primary Examiner* — Nahida Sultana
(74) *Attorney, Agent, or Firm* — Wolter Van Dyke Davis, PLLC

(57) ABSTRACT

An apparatus and method for removing excess material, preferably a powder, from a cavity of a component, wherein the apparatus includes: a platform for retaining the component, preferably an additively manufactured component, a drive mechanism being coupled to the platform, wherein the drive mechanism is configured to rotate the component being retained by the platform independently around two orthogonal spatial directions and each with an unlimited angular deflection, an actuator for mechanically actuating the platform during a removal of the excess material, and a housing, defining a working space in which the excess material can be removed from the cavity, wherein the housing seals the working space against an environment, (Continued)

and wherein any electrical components for the drive mechanism are arranged out of the working space.

18 Claims, 1 Drawing Sheet

(51) Int. Cl.
| | |
|---|---|
| *B22F 10/28* | (2021.01) |
| *B22D 29/00* | (2006.01) |
| *B33Y 40/20* | (2020.01) |
| *B22F 10/73* | (2021.01) |
| *B33Y 30/00* | (2015.01) |
| *B29C 64/35* | (2017.01) |
| *B22F 3/24* | (2006.01) |

(52) U.S. Cl.
CPC ............... *B33Y 40/20* (2020.01); *B22F 10/73* (2021.01); *B22F 2003/247* (2013.01); *B22F 2202/01* (2013.01); *B29C 64/35* (2017.08); *B33Y 30/00* (2014.12)

(58) Field of Classification Search
CPC ........... B22F 2003/247; B22F 2202/01; B33Y 40/00; B33Y 40/20; B33Y 30/00; B29C 64/35; B29C 64/379; Y02P 10/25

See application file for complete search history.

(56) References Cited

U.S. PATENT DOCUMENTS

| | | | |
|---|---|---|---|
| 2017/0165915 A1* | 6/2017 | Deng | B29C 64/236 |
| 2017/0252806 A1* | 9/2017 | Wienberg | B33Y 50/02 |
| 2018/0111219 A1* | 4/2018 | Ackelid | B22F 10/28 |
| 2018/0345600 A1* | 12/2018 | Holford | B22F 12/37 |
| 2019/0009338 A1* | 1/2019 | McMurtry | B22F 12/226 |
| 2019/0160749 A1* | 5/2019 | Hellestam | B22F 12/30 |
| 2019/0193148 A1 | 6/2019 | Keiner | |
| 2022/0314545 A1* | 10/2022 | Bromberg | B29C 64/236 |

FOREIGN PATENT DOCUMENTS

| | | |
|---|---|---|
| DE | 102016216839 A1 | 3/2018 |
| EP | 3257607 A1 | 12/2017 |
| WO | 2017017273 A1 | 2/2017 |
| WO | 2017215921 A1 | 12/2017 |

* cited by examiner

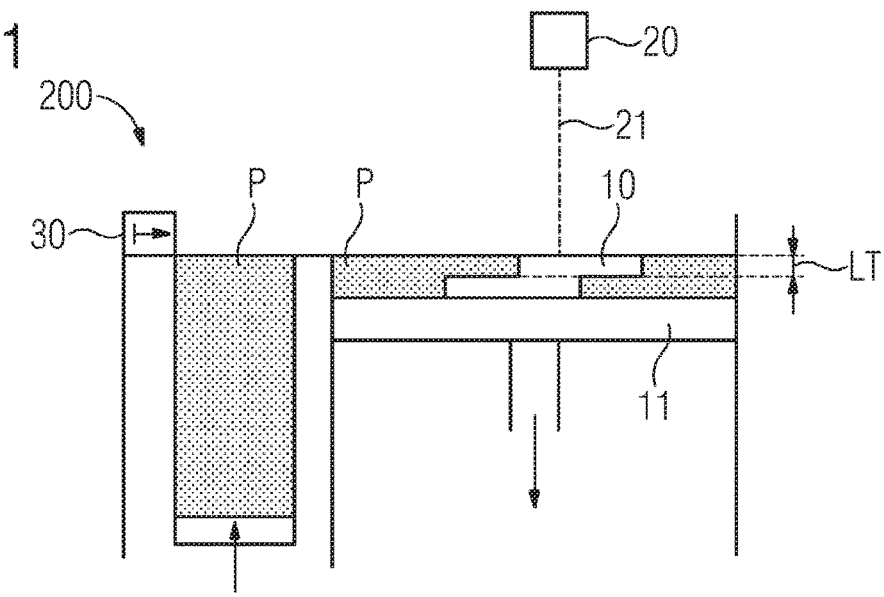
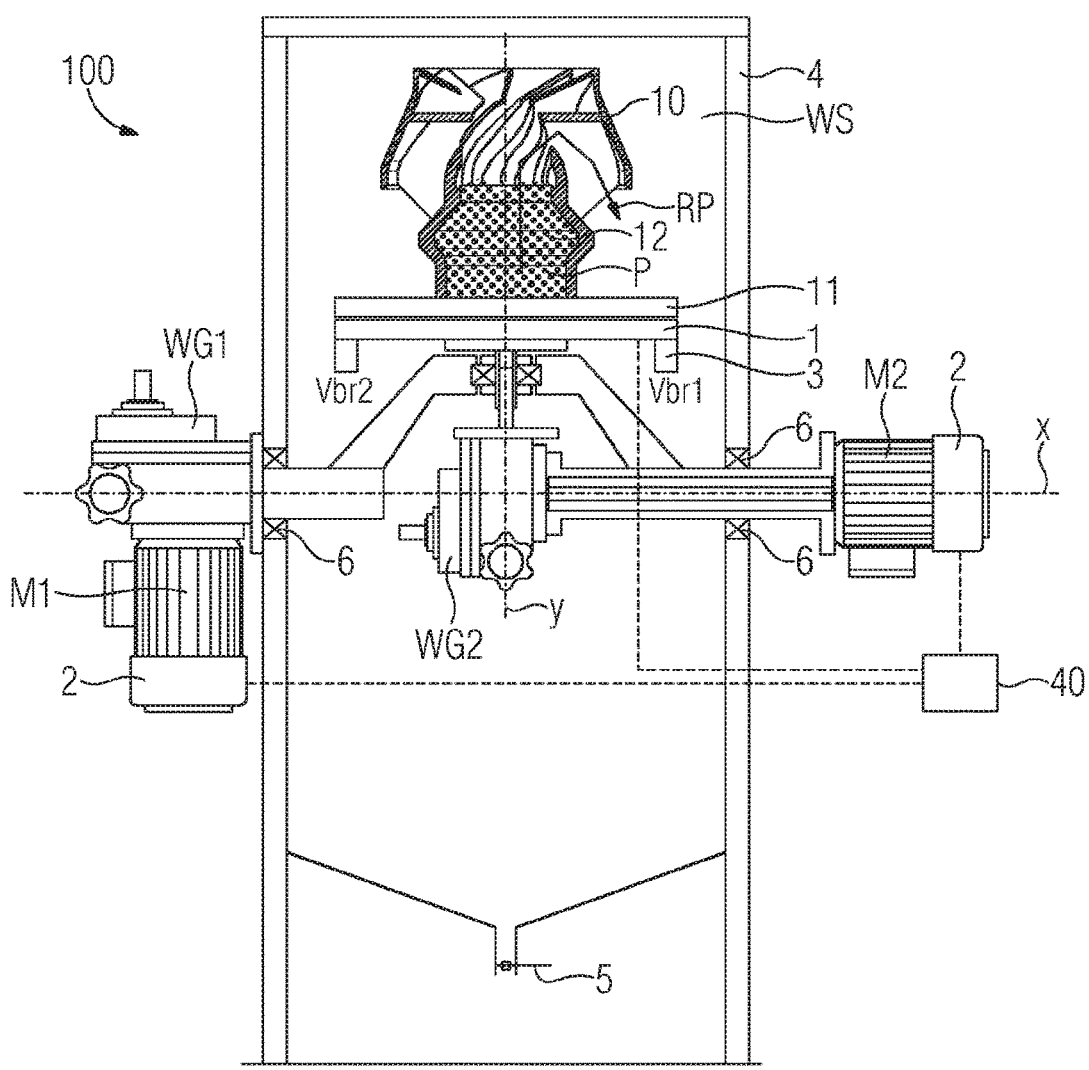

APPARATUS FOR REMOVING EXCESS MATERIAL AND METHOD OF OPERATING THE SAME

CROSS REFERENCE TO RELATED APPLICATIONS

This application is the US National Stage of International Application No. PCT/EP2019/061504 filed 6 May 2019, and claims the benefit thereof. The International Application claims the benefit of European Application No. EP18174849 filed 29 May 2018. All of the applications are incorporated by reference herein in their entirety.

FIELD OF INVENTION

An apparatus for additive component manufacturing, particularly for removing an excess material, advantageously a powder, from a cavity of a component is described. Further, a method of operating said apparatus is presented. Said apparatus may be an unpacking device, which is particularly suitable to be applied in powder bed fusion processes for the manufacture of metallic components.

Preferably, the component denotes a component applied in a turbo machine, e.g. in the flow path hardware of a gas turbine. Thus, the component is advantageously made of a nickel- or cobalt-based superalloy, e.g. a precipitation hardened alloy.

BACKGROUND OF INVENTION

A comparable apparatus for additive manufacturing is described e.g. in WO 2017/215921 A1 for example.

Additive manufacturing and/or powder bed fusion methods have proven to be useful and advantageous in the fabrication of prototypes or complex components, such as components with a mazelike or convoluted structure or functionally cooled components. Further, the additive manufacture stands out for its short chain of process steps which in turn enables material economization and a particularly low lead time.

The term "additive" in the context of manufacturing shall particularly denote a layer-wise, generative and/or bottom-up manufacturing process.

Powder-bed-based or powder-bed-fusion (PBF) manufacturing methods, such as selective laser melting (SLM), selective laser sintering (SLS) or electron beam melting (EBM) are relatively well known methods for fabricating, prototyping or manufacturing parts or components from a powdery base material, for instance. Conventional apparatuses or setups for such methods usually comprise a manufacturing or build platform on which the component is built layer-by-layer after the feeding of a layer of base material which may then be melted, e.g. by the energy of a laser beam and subsequently solidified. The layer thickness is determined by a recoater or wiper that moves, e.g. automatically, over the powder bed and removes excess material from a manufacturing plane or build space. Typical layer thicknesses amount to between 20 μm and 40 μm. During the manufacture, said laser beam scans over the surface and melts the powder on selected areas which may be predetermined by a CAD-file according to the geometry of the component to be manufactured.

After the additive buildup of a part or component through powder bed fusion, i.e. advantageously after the respective build job, the "3D-printing", is finished, internal passages and cavities of the built part(s) are inherently filled with residual powder or excess material. Consequently, it is required to remove said excess material from the internal cavities of the as-manufactured component. It is, however, not easy to remove the excess powder because the parts or components are usually heavy due to the powder fills. Particularly, gas turbine components are heavy due to the required use of high performance alloys. Moreover, internal passages and cavities may be narrow, convoluted or possess a particularly complex shape.

In conclusion, an insufficient powder removal from cavities or internal channels or passages of the as-manufactured parts may cause severe problems during post-manufacture heat-treatments the components are usually required to be exposed to for mechanical stress relieving or similar means. During said heat treatments remaining powder in the cavity may melt, sinter or stick together and subsequently block the passages. It is apparent that these effects may cause a scrap of wastage of the whole component.

In view of the ever increasing importance of additive manufacturing in industry and the relevance of digitalisation and the so-called "Internet of Things", there is a demand for a reliable process chain and techniques which are suitable to provoke or support the industrialisation of additive manufacturing. Particularly, there is a demand for robust and/or heavy duty equipment which enables to reliably and securely remove said excess base materials from the insides of components built out of a powder bed.

Even though there are already commercially available appliances which help to facilitate a "de-powdering" or unpacking of the additively produced components, the components are usually freed from any excess powder manually or with simple mechanical tools. The manual approach is particularly timely and costly in terms of time and money.

State-of-the-art providers of the given "de-powdering" equipment also suffer from a lack of operational safety. Any motors and/or electrical drives for shaking out powder residues and/or moving or tilting a fixing platform for the respective component (cf. DE 10 2013 223407 A1, for example) provide possible ignition sources in a working space or build space. This in turn poses a severe danger to any operator of the respective manufacturing device. It is known that e.g. small micrometer-sized powder particles are highly flammable and/or explosive in the presence oxygen or oxygen traces in the build space or the de-powdering equipment.

SUMMARY OF INVENTION

It is an object of the present invention to provide means to overcome the described drawbacks. Particularly, an apparatus for removing said excess powder material is provided which complies with industrialisation demands or requirements in terms of operational safety. Moreover, the apparatus is particularly versatile and robust and also suitable to be applied in the (industrialised) additive manufacturing sequence of heavy components.

The mentioned object is achieved by the subject-matters of the independent claims. Advantageous embodiments are subject-matter of the dependent claims.

An object of the present invention relates to an apparatus for removing excess material, advantageously a powder, from a cavity of the component. The apparatus comprises a platform for carrying, retaining and/or fixing the component, advantageously an additively manufactured component.

The apparatus further comprises a drive mechanism being coupled to the platform, wherein the drive mechanism is configured to rotate or deflect the component—provided that the component is retained by the platform—independently around two orthogonal, i.e. advantageously linearly independent, spatial directions and each with an unlimited angular deflection. This endless or infinite rotational degree of freedom of the platform is particularly important for sophisticated strategies by which the platform may have to be controlled in order to free a heavy and very complex component from powdery base material.

The apparatus further comprises an actuation means for mechanically actuating the platform during a removal of the excess material. Said actuation means is advantageously configured to actuate the base material at a broad frequency range or a plurality of frequencies or frequency ranges. By way of the actuation means, the platform is usually shaken or moved and at the same time rotated, tilted or varied in its orientation in order to expediently remove any residual powder materials from the cavities of a part with a sophisticated internal channel structure, for example.

The apparatus further comprises a housing defining a working space in which the excess material can be removed from the cavity, wherein the housing advantageously seals the working space against an environment. The working space may be a space of the apparatus and/or an additive manufacturing device which is, at least during its operation, usually polluted or contaminated with metallic powder. Thus, in the presence of oxygen or oxygen traces in the working space, there is inevitably a significant health risk and/or a deficiency of operational safety due to the highly reactive micro-sized powder particles as mentioned above. The working space may as well be a volume of space which can theoretically fluidly communicate with a powder polluted or contaminated area of any additive manufacturing device or corresponding unpacking station or apparatus.

Electrical components, circuits, connections or the like for the drive mechanism are, according to the presented apparatus, arranged out of the working space.

Consequently, the risk for any ignition of a powder cloud or dust explosion during a removal of the base material in the apparatus can be reduced to a minimum or even completely excluded. Thus, operational safety of additive manufacturing plants of facilities may be increased or even only assured. In view of the current industrialisation trends, the presented apparatus may even provide a prerequisite for a broad application and/or automated integration and industrialisation of additive manufacturing.

In an embodiment, the drive mechanism comprises two independently controllable worm gears or worm gear boxes, one worm gear being configured for the rotation of the platform around one spatial direction each. According to this embodiment, the infinite rotational degree of freedom or movement with unlimited angular deflection may be easily implemented.

In an embodiment, an electrical motor for driving the mentioned worm gears and any electrical connection is arranged outside of the working space or fluidically sealed or separated therefrom. Thus, metallic dust explosions may be prevented reliably.

In an embodiment, the actuation means is arranged inside the working space and driven by a pressurised inert gas and without any electrical gear. According to this embodiment, an actuation of the platform may be realised without any electrical drives which may cause as a source of ignition or reaction of remaining metallic powder. At the same time, the actuation means may be provided very close to the platform and with lots of momentum for actuating, shaking or vibrating even heavy powder loaded components.

In an embodiment, the actuation means comprises a first vibration generator being configured for actuating the base material and/or the component at a first frequency of frequency range.

In an embodiment, the actuation means comprises a second vibration generator being configured for actuating the base material and/or component at a second frequency.

The second frequency or frequency range is advantageously different or separate from the first frequency of frequency range.

According to these embodiments, an actuation may be carried out for different purposes. For example, for a reliable powder removal in the context of additive manufacturing, it is often necessary to loosen or break e.g. partly melted or sintered powder particles in the cavities or internal spaces. In a separate step, the loosened powder has then still to be shaken out of any cavities, such as e.g. moved according to a trajectory defining an optimal escape pass out of the component.

In an embodiment, the first vibration generator is a low frequency, high impact or momentum generator. According to this embodiment, the actuation means may be configured for the actuation of particularly heavy structure or components for the actuation of which a higher momentum and/or power is required. Accordingly, the actuation means may be tailored for the actuation at larger amplitudes, for example. This may be required for example when the additively manufactured part or component is heavy, if internal spaces or cavities are quite bulky and/or a large amount of powder has to be shaken out of the cavity.

In an embodiment, the second vibration generator is a high frequency, low impact or momentum generator. According to this embodiment, the actuation means may be configured for the actuation of e.g. lighter components for the actuation of which predominantly the frequency is crucial and only little momentum or power is necessary. Accordingly, the actuation means may be tailored for the actuation at high frequencies and small amplitudes only. This may be required for example when the additively manufactured component is rather small and also internal spaces from which the powder has to be removed are small and possibly intricate or mazelike. Additionally or alternatively, the second vibration generator may indeed be used for a powder loosening also in the case of heavy components.

In an embodiment, wherein the first frequency of frequency range comprises frequencies from 1 mHz to 1 Hz or 100 mHz to 1 Hz.

In an embodiment, wherein the second frequency of frequency range comprises frequencies from 1 Hz to 10 kHz.

In an embodiment, when the first vibration generator and the second vibration generator are independently controllable.

In an embodiment, the apparatus is configured to allow for driving and actuating and/or rotating of the platform (for powder removal) while carrying or retaining large masses, particularly masks larger than 50 kg. According to this embodiment, the component advantageously weighs more than 50 kg along with the residual axis material included or enclosed.

In an embodiment, the apparatus is configured such that, by mechanical actuation of the platform, a powdery base material contained in an e.g. intricate or convoluted, cavity of the component may be removed from or shaken out said cavity.

In an embodiment, the apparatus comprises a control unit being connected to the drive mechanism and/or the actuation means. By way of said control unit, the whole apparatus may advantageously be controlled, e.g. by computer control and/or an algorithm which may cause the apparatus to operate such that an optimized or ideal escape path or powder travelling route is chosen. Said path or road may e.g. be the result of a calculation and/or a simulation.

A further aspect of the present invention relates to a method of operating the apparatus, wherein the apparatus is controlled by a computer program which drives and actuates the platform and the consideration of gravity, the location of cavity openings of the component and an ideal axis material removal path.

Advantages and embodiments relating to the described apparatus may as well pertain to the method of operating the same, and vice versa.

Further features, expediencies and advantageous refinements become apparent from the following description of the exemplary embodiment in connection with the Figures.

BRIEF DESCRIPTION OF THE DRAWINGS

FIG. 1 indicates in a schematic view an additive powder bed fusion process with a component shown during its additive manufacture.

FIG. 2 shows a simplified schematic of an apparatus for the removal of excess material from an inside of an additively manufactured component according to the present invention.

DETAILED DESCRIPTION OF INVENTION

Like elements, elements of the same kind and identically acting elements may be provided with the same reference numerals in the Figures.

FIG. 1 shows an additive manufacturing device 200. The device 200 may constitute a state of the art hardware for selective laser melting or electron beam melting. The device 200 comprises a build platform or substrate plate 11. On the substrate plate 11, a component 10 is advantageously directly manufactured, i.e. welded. Preferably the component 10 is buildup in the device 200 out of a powder bed of a powder P. Said component or part 10 advantageously relates to a turbine component, such as a component applied in the hot gas path of a gas turbine (not explicitly indicated). Particularly, the component 10 may relate to a blade, vane, shroud, shield, such as heat shield, tip, segment, insert, injector, seal, transition, burner, nozzle, strainer, orifice, liner, distributor, dome, boost, cone, lance, plate, resonator, piston or any corresponding retrofit.

In FIG. 1, the component 10 is advantageously depicted during its manufacture and only partly established. It is indicated that, after the deposition of a powder layer, e.g. with the aid of a deposition apparatus or recoater 30, an energy beam 21 is used to selectively melt the powder for the layerwise buildup of the component 10. A layer thickness of the layer may amount to LT, as indicated on the right in FIG. 1.

Said energy beam 21 is advantageously emitted from an irradiation apparatus 20, such as an electron beam or laser source. After the local melting due to the energy beam 21, the material expediently solidifies in the final structure for the component 10.

After a layer has been manufactured, the platform 1 is advantageously lowered by a distance corresponding to the layer thickness LT. Further, the deposition apparatus 30 advantageously distributes a further powder layer which may be moved from a stock or supply (not explicitly numerically indicated) of the respective powdery base material P as shown in the left of FIG. 1.

The actual powder bed fusion process is advantageously carried out under an inert gas atmosphere or at least an atmosphere with reduced oxygen content in order to avoid significant oxidation or deterioration of powder in/or the component 10. Said inert gas or gas flow (not explicitly indicated) may be established in a laminar manner, e.g. with an inlet and an outlet in the build space. Additionally or alternatively, said inert gas may be used for purging or "inertising" only parts of the powder bed, e.g. a melt pool during the operation of the device.

FIG. 2 shows an apparatus 100 in a schematic (at least partly) sectional view. The apparatus 100 is advantageously an unpacking apparatus and/or configured for removing an excess material P, advantageously an excess powder as a base material from an inside, a cavity or other passageways or spaces defined by the structure and/or design of the as-manufactured part 10.

The apparatus 100 comprises a platform 1 for retaining the component (cf. reference numeral 10 in FIG. 2). This platform may be a table onto which the substrate plate 11 may be fixed or clamped or secured otherwise.

The apparatus 100 further comprises a drive mechanism 2 which is coupled to the platform 1. Said drive mechanism 2 is configured to rotate the component 10 or deflect it, advantageously independently, around two orthogonal spatial directions, which are indicated by the horizontal axis X and the vertical Y-axis in FIG. 2. Preferably, said drive mechanism 2 is capable of rotating the platform 1 around the X-axis and the Y-axis with an unlimited angular deflection or degree of freedom. In other words, the platform may advantageously be rotated in an endless loop or at a multiplicity of revolutions such that very complicated and sophisticated powder escape turns and actuation is of the platform carrying or retaining the component may be applied in order to reliably remove the excess powder P from a cavity (not explicitly indicated) of the component 10.

It is shown in FIG. 2 that a fairly complex and heavy component 10 is arranged, advantageously welded, to the substrate plate 11. The substrate plate 11 is in turn retained by the platform 1. The curved arrow is further indicated in FIG. 2 with numeral RP. Said arrow RP shall indicate a powder removal path of powder P which remained e.g. close to the substrate plate 11 and originated from powder bed based manufacture (cf. FIG. 1).

To facilitate e.g. a rotation around the X-axis, a first motor M1 is provided by the drive mechanism 2. Motor M1 advantageously drives a driveshaft via a first worm gear or worm gear box WG1 such that the platform 1 may be angularly deflected or rotated by an angle α.

To facilitate e.g. a rotation around the Y-axis, a second motor M2 is provided by the drive mechanism 2. Motor M2 advantageously drives a driveshaft via a second worm gear or worm gear box WG2 such that the platform 1 may be angularly deflected or rotated by an angle β.

Said worm gear embodiments particularly allow for an infinite rotational movement, when the motors M1, M2 are continuously operated, respectively.

Said worm gears WG1, WG2 are expediently functioning independently, wherein each worm gear is set up for the rotation of the platform 1 around one spatial direction each.

As indicated in FIG. 2, said motors, drive shafts and worm gear (boxes) are advantageously arranged such that said independent control and movement can be implemented. To this effect, the second worm gear WG2 or its corresponding driveshaft (not explicitly indicated) is e.g. located axially (i.e. aligned with the X-axis), wherein the first worm gear (box) WG1 may be aligned with the Y-axis and/or parallel to a longitudinal axis of the component 10 orthogonal to the substrate plate 11.

In the given exemplary embodiment of FIG. 2, the platform 1 may be mounted directly with a platform plane aligned perpendicularly with respect to the driveshaft of the second worm gear WG2. Further, the platform 1 is coupled and/or fixed to a lever of the first worm gear WG1.

Of course, said motors M1, M2 can be controlled independently such that any superposition of said rotational movements may be chosen and implemented for very complex powder removal paths (cf. above). E.g. by way of these infinite rotational degrees of freedom around two linearly independent spatial directions (X, Y), every perceivable orientation of the component 10 may be implemented. Merely for the sake of simplicity only a vertically aligned orientation of a longitudinal axis of the component 10 (cf. X-axis) is indicated in FIG. 2. Any trapped powder may, thus, be removed from cavities (not explicitly indicated in FIG. 2) of the component 10, provided that tailored or intelligent controls and algorithms are applied for the control of the apparatus, the drive mechanism and/or the actuation means. The only it a may be the presence of adequately dimensioned openings of the cavities via access base material may escape from the component.

If the component 10 is e.g. a burner component for a gas turbine, the escape routes calculated or simulated by which the powder P has to be removed, may be very complex and require the apparatus to be controlled with lots of tailored movements and actuations.

The apparatus 100 advantageously further comprises a control unit 40. Via the control unit 40 the apparatus 100 may be controlled, e.g. computer-controlled. The control unit 40 may thus constitute or comprise a data processing unit.

The apparatus 100 further comprises a housing 4. The housing 4 advantageously defines a working space WS. During the operation of the apparatus 100, the working space WS is expediently polluted, contaminated or exposed or fluidically connected to residual powder material P which is actually being removed from an inside of the component 10. Swirled powder dust or powder clouds may consequently pose significant ignition or explosion risks.

During or after the powder removal in the working space WS, according to the embodiment shown in FIG. 2, the residual powder P may fall to the bottom of the working space WS and be collected in a funnel and/or collection tray 5.

According to the present solution, the housing 4 seals the working space WS against the environment (not explicitly indicated) by means of seals 6. Said seals 6 may e.g. surround the drive shafts of the electrical motors M1, M2 for driving the respective worm gears.

It is further shown in FIG. 2, that any electrical components for the drive mechanism and/or any further perceivable electrical components are arranged out of the working space WS in order to lower and most advantageously exclude any risk of ignition of powder clouds in the working space WS.

The apparatus 100 further comprises an actuation means 3 for mechanically actuating the platform during a removal of the excess material P.

The actuation means 3, is arranged inside the working space WS, and driven by a pressurised inert gas and without any electrical gear. This allows to minimise the risk of ignition and/or explosion of powder dust in the working space WS (cf. above).

The actuation means 3 comprises a first vibration generator Vbr1 being configured for actuating the platform 1, the substrate 11 and/or base material P at a first frequency F1 corresponding frequency range.

The actuation means 3 advantageously further comprises a second vibration generator Vbr2 being configured for actuating the platform 1, the substrate 11 and/or base material P at a second frequency F2 or corresponding frequency range.

The second frequency (range) F2 is, advantageously, different from the first frequency (range) F1.

The first vibration generator Vbr1 is advantageously a low frequency, high impact generator. The first frequency F1 may e.g. comprises or span frequencies from 1 mHz to 1 Hz.

On the other hand, the second vibration generator Vbr2 is advantageously a high frequency, low impact generator. The second frequency F2 may comprise frequencies from 1 Hz to 10 kHz.

Although the actuation means 3 is advantageously arranged inside the working space WS, no risk of explosion is provided by this embodiment of the actuation means 3, as the actuation means 3 is advantageously driven by a pressurised inert gas and without any electrical gear. Further, said actuation may be carried out in situ, i.e. directly at and in the vicinity of the platform 1, where the actuating effect is required.

The apparatus 100 and all its components and features are advantageously configured to drive, i.e. move, actuate as well as rotate large masses, advantageously masses of more than 10 kg, advantageously more than 50 kg, or even larger masses such as masses in excess of 100 kg or more. Thus, said apparatus 100 may be applied in a very versatile way and without limitation of the used base material.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. An apparatus for removing excess material from a cavity of a component, comprising:
   a platform for retaining the component,
   a drive mechanism being coupled to the platform, wherein the drive mechanism is configured to rotate the component being retained by the platform independently around two orthogonal spatial directions (X, Y) and each with an unlimited angular deflection ($\alpha$, $\beta$),
   an actuation means for mechanically actuating the platform during a removal of the excess material, and
   a housing, defining a working space in which the excess material is removable from the cavity, wherein the housing seals the working space against an environment, wherein any electrical components for the drive mechanism are arranged out of the working space, and wherein the drive mechanism is configured to rotate the platform independently around the two orthogonal spatial directions (X, Y) relative to the housing while the platform is inside the housing.

2. The apparatus according to claim 1,
   wherein the drive mechanism comprises two independently controllable worm gears, one worm gear being configured for rotation of the platform around one spatial direction (X, Y) each, and wherein any electrical motor for driving said worm gears and any electrical connections are arranged outside of the working space.

3. The apparatus according to claim 1,
wherein the actuation means, is arranged inside the working space, and driven by a pressurised inert gas and without any electrical gear.

4. The apparatus according to claim 1,
wherein the actuation means comprises a first vibration generator being configured for actuating the platform at a first frequency and a second vibration generator being configured for actuating the platform at a second frequency being different from the first frequency.

5. The apparatus according to claim 4,
wherein the first vibration generator is a low frequency, high impact generator, and the second vibration generator is a high frequency, low impact generator.

6. The apparatus according to claim 4,
wherein the first frequency comprises frequencies from 1 mHz to 1 Hz.

7. The apparatus according to claim 4,
wherein the second frequency comprise frequencies from 1 Hz to 10 kHz.

8. The apparatus according to claim 4,
wherein the first vibration generator and the second vibration generator are independently controllable.

9. The apparatus according to claim 1,
wherein the apparatus is configured to allow for driving and actuating the platform while retaining large masses.

10. The apparatus according to claim 1, further comprising:
a control unit being connected to the drive mechanism and the actuation means.

11. A method of operating the apparatus according to claim 1,
wherein the apparatus is controlled by a computer program which drives and actuates the platform under consideration of gravity, cavity openings of the component and an ideal excess material removal path.

12. The apparatus according to claim 1,
wherein the excess material comprises a powder.

13. The apparatus according to claim 1,
wherein the component comprises an additively manufactured component.

14. The apparatus according to claim 9,
wherein the large masses are more than 50 kg.

15. An apparatus for removing excess material from a cavity of a component, comprising:
a housing that defines a working space in which the excess material is removable from the cavity, wherein the housing seals the working space against a surrounding environment;
a platform disposed within the housing and configured to retain the component; and
a drive mechanism configured to rotate the platform independently around two orthogonal spatial directions (X, Y) inside of and relative to the housing, wherein the drive mechanism comprises a motor disposed outside the housing; a drive train that connects the motor to the platform; and a seal that provides a seal between the housing and the drive train where the drive train passes through the housing.

16. The apparatus of claim 15, further comprising an actuation means for mechanically actuating the platform during removal of the excess material.

17. An apparatus for removing excess material from a cavity of a component, comprising:
a housing that defines a working space in which the excess material is removable from the cavity and that is at least in fluid communication with an additive manufacturing space when an additive manufacturing process occurs, wherein the housing seals the working space against a surrounding environment;
a platform disposed within the housing and configured to retain the component; and
a drive mechanism configured to rotate the platform independently around two orthogonal spatial directions (X, Y), wherein the drive mechanism comprises a motor disposed outside the housing and a drive train that connects the motor to the platform, and wherein any electrical components for the drive mechanism are arranged out of the working space.

18. The apparatus of claim 17, wherein the housing defines both the working space and the additive manufacturing space, and wherein the housing seals both the working space and the additive manufacturing space from the surrounding environment.

* * * * *